United States Patent [19]

Holzhammer et al.

[11] Patent Number: 5,754,869
[45] Date of Patent: May 19, 1998

[54] METHOD AND APPARATUS FOR MANAGING POWER CONSUMPTION OF THE CPU AND ON-BOARD SYSTEM DEVICES OF PERSONAL COMPUTERS

[75] Inventors: Gerald S. Holzhammer, Aloha; Thomas J. Hernandez, Beaverton; Richard P. Mangold, Hillsboro; Sudarshan Bala Cadambi, Portland, all of Oreg.

[73] Assignee: Intel Corporation, Santa Clara, Calif.

[21] Appl. No.: 789,066

[22] Filed: Jan. 27, 1997

Related U.S. Application Data

[63] Continuation of Ser. No. 317,912, Oct. 4, 1994, abandoned.
[51] Int. Cl.[6] .............................. G06F 1/32; G06F 11/34
[52] U.S. Cl. ................................................ 395/750.01
[58] Field of Search ............................ 395/750, 500, 395/550, 560, 750.01; 364/707

[56] References Cited

U.S. PATENT DOCUMENTS

| | | | |
|---|---|---|---|
| 4,851,987 | 7/1989 | Day | 395/550 |
| 5,239,652 | 8/1993 | Seibert et al. | 395/750 |
| 5,355,501 | 10/1994 | Gross et al. | 395/750 |
| 5,396,635 | 3/1995 | Fung | 395/800 |
| 5,428,790 | 6/1995 | Harper et al. | 395/750 |
| 5,461,266 | 10/1995 | Koreeda et al. | 307/125 |
| 5,511,205 | 4/1996 | Kannan et al. | 395/750 |
| 5,590,342 | 12/1996 | Marisetty | 395/750 |

*Primary Examiner*—Jacques H. Louis-Jacques
*Assistant Examiner*—Ayni Mohamed
*Attorney, Agent, or Firm*—Blakely, Sokoloff, Taylor & Zafman

[57] ABSTRACT

A system for managing power consumption in a personal computer, specifically the CPU and on-board system devices. The present invention manages the power consumption of the CPU and on-board system devices (i.e., core logic) using a global event messaging scheme and an OS-Idle power event and interrupts to provide CPU power management. The CPU's low-power state is implemented such that any or a set of predetermined device interrupts will transition the CPU from low-power state to normal operation which commences at the first instruction of the interrupt handler invoked by the device interrupt. The power consumed by the platform/chipset and controller logic devices, i.e., core logic, influenced by system clocks can be managed by decreasing frequency or stopping the distributed clock(s) altogether when in low-power state. Where chipsets manage clock distribution, additional hardware mechanisms for curtailing clocks may be incorporated which can be activated by software but are de-activated automatically in hardware. A power management coordinator may be incorporated to reduce voltage spikes or sags.

7 Claims, 7 Drawing Sheets

METHOD AND APPARATUS FOR MANAGING POWER CONSUMPTION OF THE CPU AND ON-BOARD SYSTEM DEVICES OF PERSONAL COMPUTERS

This is a continuation of application Ser. No. 08/317,912 filed Oct. 4, 1994, and now abandoned.

BRIEF SUMMARY OF THE INVENTION

The present invention is a system for managing power consumption in a personal computer, specifically the CPU and on-board system devices. While to date most techniques for managing power consumption in personal computers have been for the purpose of extending battery life of portable computers whose usual source of power is a battery, by providing techniques for managing power consumption in desktop computers as well, whose usual source of power is a 120 volt, 60 Hz. wall connection, substantial savings in electric power consumption are possible due to the large number of computers which are left on for extended periods of time, even when not being actively used.

Power consumption management systems, whether present in a portable computer or desktop computer, traditionally rely upon hardware timers which, upon expiration, turn off or reduce power to various system components without informing the operating system which controls the computer. For example, such prior art systems, upon expiration of the hardware timer, generate a system management interrupt (SMI), which shuts down a specific subsystem. The subsystem could even be the processor itself which, once it is turned off, can only be awakened by another hardware generated signal. If the computer is connected to a network, such processor shutdown would result in a loss of the network connection. By utilizing hardware generated events as a power consumption management tool, the operating system is not made aware of such shutdowns. As a result, when the subsystem is awakened, the operating system, being unaware of the shutdown, interacts with the subsystem as if there were no shutdown which can result in inconsistent operation.

Each subsystem in the computer requires specific techniques for power reduction that must be known to the system that controls the power reduction. Effective reduction of power may require coordinated power reduction actions by more than one subsystem. Additionally, when devices are being turned on and off asynchronously, without coordination, if several devices attempt to power off or on simultaneously, there could be large voltages spikes or sags that adversely impact system reliability. These potential problems are mitigated in portable computer systems where the number of subsystems is limited and known by the system designer who can include necessary techniques and safeguards in the system firmware which has intimate knowledge of the hardware under its control. However, in a desktop system, where there may be numerous add-on subsystems such as network cards, CD-ROM controller cards, graphics cards and the like, it is extremely difficult or sometimes impossible to fully provide for power consumption management of all subsystems without providing suitable notification to the operating system which can then coordinate these activities.

The present invention addresses these problems by providing a software and hardware architecture for managing the power consumption of the CPU and on-board system devices (i.e., core logic) using a global event messaging scheme.

DETAILED DESCRIPTION OF THE INVENTION

The present invention utilizes the fact that in a computer system, each device driver has the best knowledge for how and when to power its associated device down or up. By defining a set of power events and delivering them to device drivers, each driver can make the decision as to whether that power event should affect its coupled device's power state.

Power events are generated under the following conditions:

| Power Event | Condition |
|---|---|
| User_Idle | No keyboard or mouse activity for a user configurable period of time |
| User_Active | Keyboard or mouse activity |
| Sleep | A predefined user input occurs, at a user configurable timer expiration and/or by a network generated command |
| Wakeup | A predefined user input, at a user configurable timer expiration and/or by a network generated command |
| OS_Idle | CPU cycling in an operating system idle loop |

Device power states and the conditions under which each is active are as follows:

| Power State | Active Condition |
|---|---|
| PM_Enabled | Device is in use and may be operating at a reduced power level in a manner which is transparent to the device user |
| Suspend | Device is not in use and power can be removed without causing adverse effect on other devices |
| Normal | Device is in use and operating at full power |
| Standby | Device is not in use and is operating at a reduced power level |
| Off | Power has been removed from device |

Figure 1:
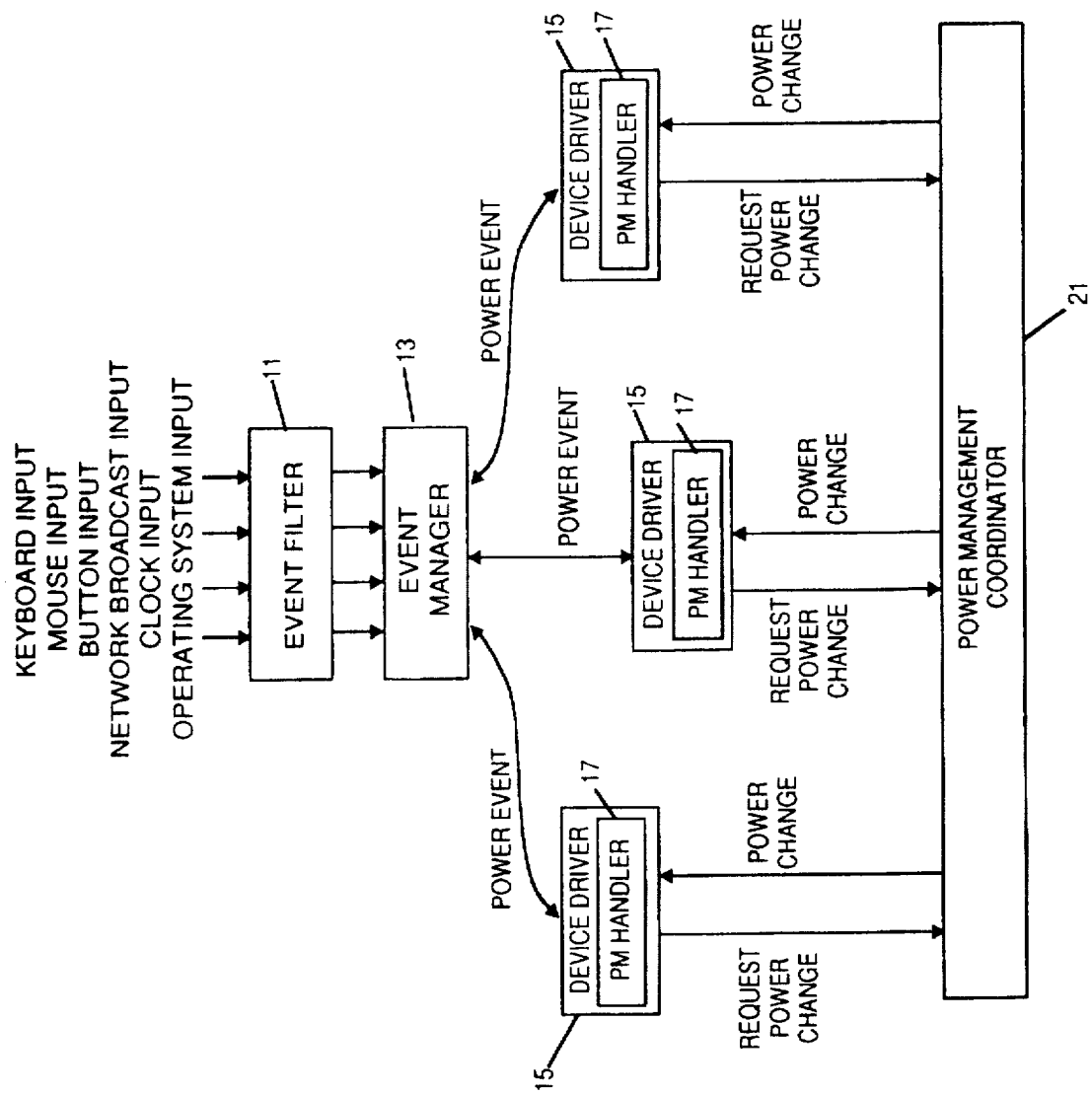
FIG. 1 is a block diagram showing the overall architecture of the invented system.

Once a driver has determined that a change should be made to its associated device's power state, the present invention operates to cause the power state change to take place or utilizes a coordinating piece of software that decides if it should allow the transition. For example, in the case where the device is on a bus that is powered down, and the device driver is issuing a request to be allowed to power up its associated device, the bus must first be powered-up through the device driver (in this case, a bus driver), before allowing the device to power up. A central power management coordinator (hereinafter PM Coordinator) could be used in connection with power sequencing to prevent large power spikes/sags when multiple devices need to power up/down based on the same event. FIG. 1 is an illustration of an architecture for personal computer power management according to the present invention including the optional PM Coordinator.

Figure 2A:
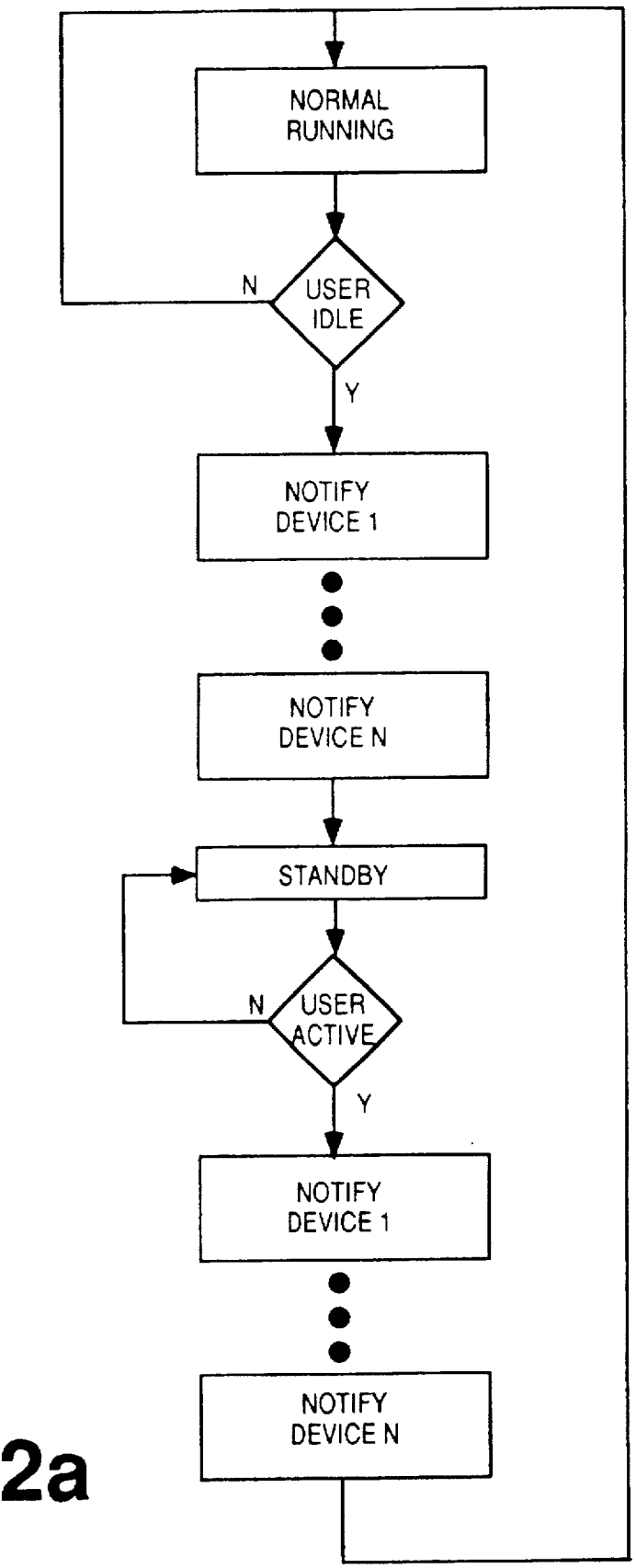
FIG. 2a is a flow diagram showing the flow of the processing performed by an event manager for User_Idle/User_Active power events.
Figure 2B:
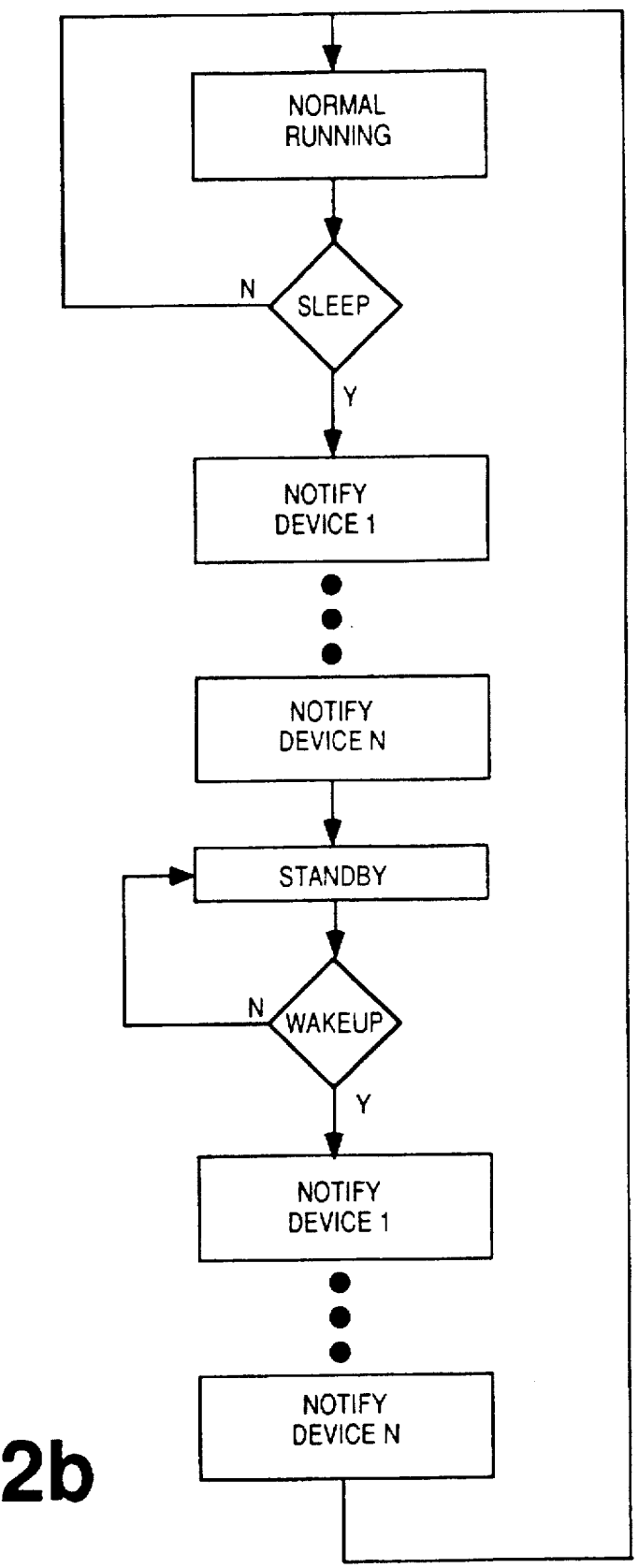
FIG. 2b is a flow diagram showing the flow of the processing performed by an event manager for Sleep/Wakeup power events.
Figure 2C:
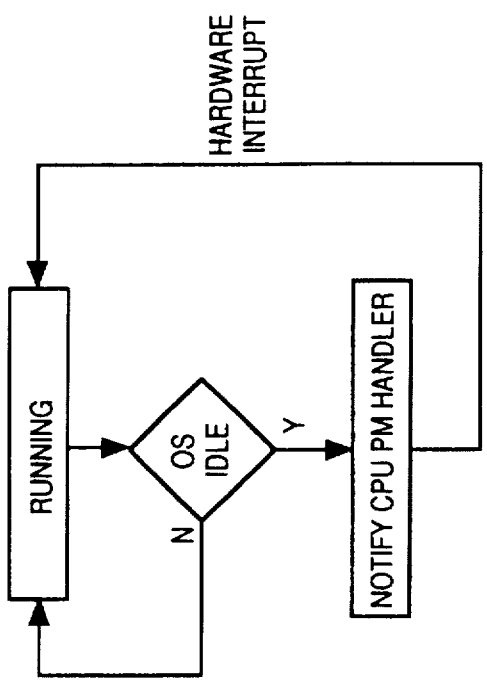
FIG. 2c is a flow diagram showing the flow of the processing performed by an event manager for the OS_Idle power event.

Power events can be generated by any software running on the system. In most cases they are generated by a device driver on the system board. As previously noted, examples of power events are: User_Idle, User_Active, Sleep, Wakeup, and OS_Idle. The first two are based on keyboard/mouse input. The next two might be created by a sleep button being pushed, a timer being preprogrammed to power down the machine at night, or perhaps by a network broadcast and the last by the operating system itself upon entering an idle loop. Power events are shown in FIG. 1 as being created as a result of more specific system events (e.g., keyboard input, mouse movement, button press, network broadcast, timer expiration) which are input to an event filter 11. Event filter 11 processes these inputs to generate a corresponding power event. The power events generated from event filter 11 are input to event manager 13 which passes the generated power events to device drivers 15. The details of suitable mechanisms for the software generation of the OS_Idle, User_Idle, User_Active, Sleep, and Wakeup power events should be readily apparent to persons skilled in the field of the invention. The event manager 13 is responsible for receiving and passing on power events to each device driver 15. The event manager 13 is a piece of software that is responsible for globally broadcasting certain power events to all device drivers. The event manager acts as a conduit for events, tracking and distributing events to proper destinations as needed. FIGS. 2a–2c are flowcharts which show the processing performed by an event manager 13 according to the present invention for User_Idle/User_Active power events (FIG. 2a), Sleep/Wakeup power events (FIG. 2b) and OS_Idle (FIG. 2c).

All device drivers 15 register a callback entry point with event manager 13 for receiving power events from the event manager. This entry point is a PM handler 17 within each device driver that processes the events.

Figure 4:
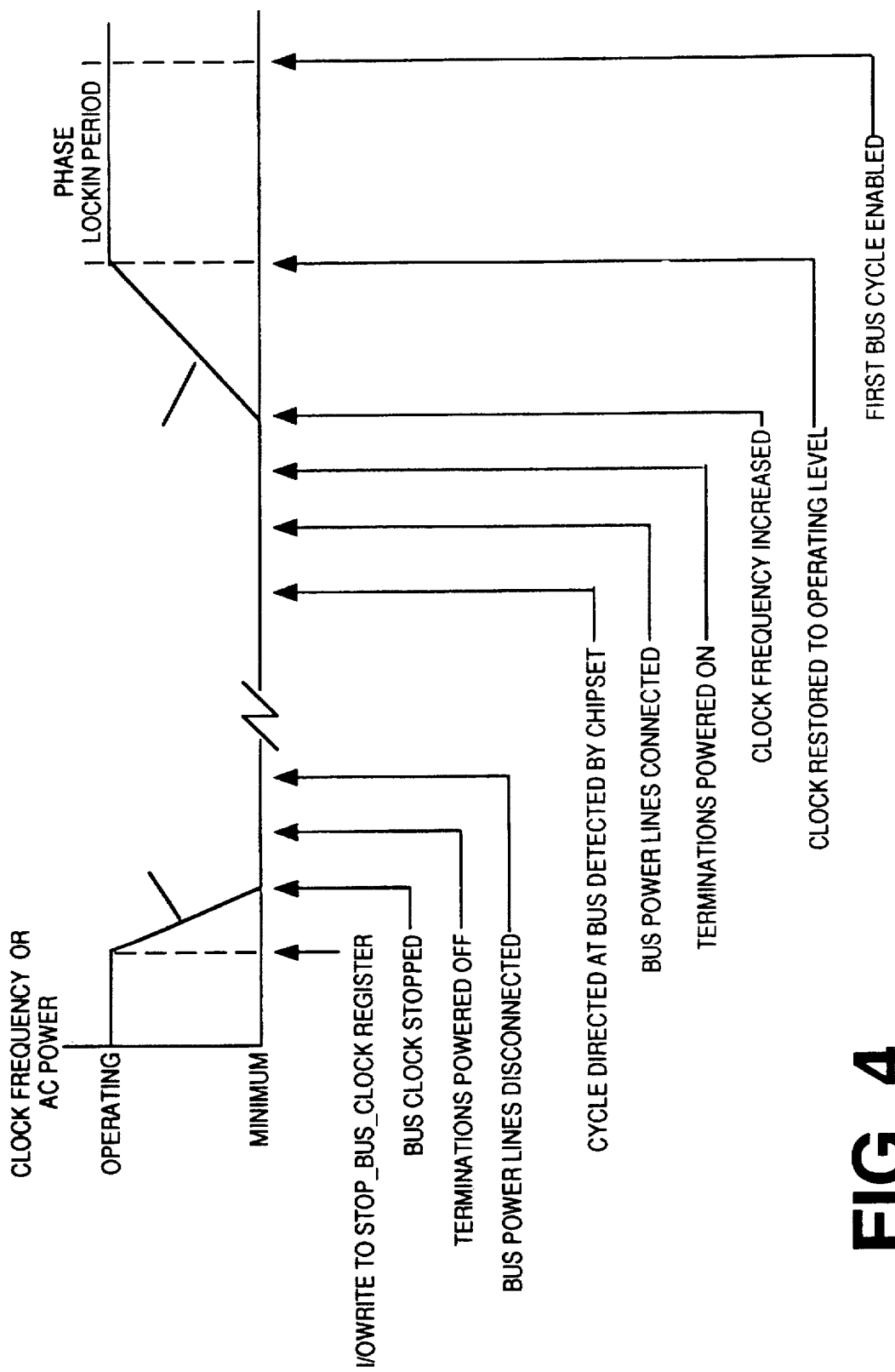
FIG. 4 is a diagram illustrating the relative timings for powering down and powering up buses, chipsets and controllers.

The processing performed by each PM handler 17 for User_Idle/User_Active power events is shown in FIG. 4. The processing performed by a PM handler for Sleep/Wakeup power events would be essentially the same except that for User_Idle and User_Active, an idle/sleep timer is set to a user configurable amount of time, while for the Sleep and Wakeup power events no timer is used. Instead, the Wakeup power event causes the device to wake up immediately, and the Sleep power event causes the device to be put into a lower power state when the device is no longer in use and there are no pending device access requests.

It is the responsibility of each PM handler 17 of each device driver 15 to determine if the power event received should affect its coupled device's power state. Most device drivers use power events such as Sleep and Wakeup to instigate power transitions. Other device drivers, such as video drivers, would also use the User_Idle and User_Active events to turn off user output. Once the device driver has determined that the event affects its coupled device's power state, and that it is safe to start the power transition (i.e. the device is not busy), in one embodiment, it initiates the transition, and in another embodiment, it requests permission to transition from PM Coordinator 21, the specifics of which are described in co-pending patent application Ser. No. 08/318,051 filed Oct. 10, 1994. Co-pending application Ser. No. 08/318,052 filed Oct. 10, 1994 describes the use of a system for managing the power consumption of a display and other peripheral devices associated with a personal computer.

PM Coordinator 21 is implemented as software which decides if state transitions for devices which have been requested by their device drivers can be safely initiated, and that they occur in the correct sequence. If, for example, the only device on a bus issues a request to enter the suspend power state, the PM Coordinator might approve the transition, and then tell the bus driver that it can power its bus down. The converse is also true. If a device driver issues a request to power up, there might be another device (such as a bus) that should be powered up first. It is the PM Coordinator's responsibility to make sure that power transitions occur in the correct sequence, and also that devices do not power up simultaneously, causing voltage spikes/drops. The PM Coordinator is responsible for approving power transition requests from device drivers. The PM Coordinator bases its approval on recovery delays of each device. This delay is provided by the device driver as part of the power change request. The PM Coordinator uses this delay to prevent multiple devices from simultaneously transitioning. The device driver also relays information about the new power level to the PM Coordinator. If the new power state is Suspend, the PM Coordinator may decide to suspend parents of that device such as its expansion bus. Conversely, if a device driver requests a power change, and the parents of that device are suspended, then the PM Coordinator must turn them on first before the device driver can access its associated device. In order for the PM Coordinator to be able to turn off buses, there must be a database tree of power management dependencies which is built by the operating system. The operating system may build this tree by having device drivers of devices to be power managed register their power and child power relationships (i.e., specify all devices who should not have power applied to them until the parent device has had power supplied to it) with the PM coordinator as part of their initialization sequence.

POWER MANAGEMENT OF CPU AND ON-BOARD SYSTEM DEVICES

A. CPU Power Management

The present invention utilizes the OS-Idle power event and interrupts to provide CPU power management.

(1) OS_Idle Generation

The operating system is in the idle state, causing OS_Idle to be generated, whenever there are no actively running tasks. When OS_Idle is generated, which is a system function which takes place regardless of whether or not the system has power management capabilities, the system/motherboard device driver may then change the power state of CPU. The Idle state notification, which results in an OS_Idle power event notification is generated by the operating system itself. OS_Idle is utilized by hooking (e.g., via a call-out from an idle routine) the Idle state of the operating system scheduler. Idle state notification mechanisms are part of existing personal computer and operating system designs and, therefore implementation details are not set forth herein. The details for changing the power state of the CPU are described below.

(2) Interrupt Generation

Interrupts which may be used for power management of the CPU are generated by existing asynchronous interrupt reporting mechanisms of present day personal computers which cause the operating system to exit the Idle state.

Given existing mechanisms for Idle state and interrupt reporting, significant power consumption savings can be achieved by implementing a) a mechanism to enter low-power CPU state when OS_Idle is generated; and b) a mechanism to resume normal CPU power state on any device interrupt.

Figure 3:
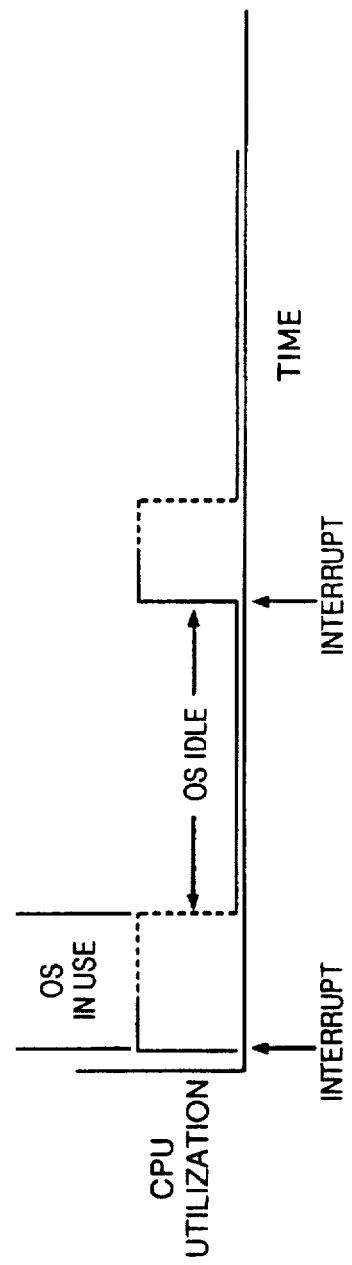
FIG. 3 is a diagram showing the timing relationship between operating system in use and operating system idle.

A significant amount of power is consumed by software executing the system idle loop (referred to herein as the OS_Idle handler). For example, there are memory bus accesses, each consuming power, while looping in the OS_Idle handler. By stopping the CPU while the operating system is in the Idle state using the HALT instruction present in most commercially available microprocessors, power consumption is reduced since the OS_Idle handler is not running. Further, by preventing the OS_Idle handler from using CPU cycles when not needed and by resuming normal CPU operation when there is a device interrupt, the reduced power consumption is accomplished without any loss in utility or functionality. FIG. 3 illustrates this concept wherein each time a hardware interrupt is generated, the CPU is in use for some period of time during which the interrupt and any active processes use up CPU cycles. The dashed line portion of the line indicates the amount of time the CPU is in use processing interrupts or running active processes varies. However, unless all CPU cycles are used in between the hardware interrupts, there is some period of time during which the CPU is running only the OS_Idle handler. This is the period of time referred to herein as OS-Idle.

(a) Mechanism to Enter Low-Power CPU State

As the number of transistors and clock frequencies increase, the CPU itself is consuming a significant amount of the platform power budget. For this reason it is desirable for the CPU to enter a low-power state when the OS_Idle power event is generated. To facilitate the CPU entering the low power state, the CPU (1) provides a dedicated instruction to enter a low-power state, (2) enters a low-power state whenever the standard HALT instruction is executed, or (3) enters a low-power state based on a hardware signal resulting from an I/O or memory address-mapped register. In this manner, since the CPU is not always running, there is an energy savings. The mechanism by which the CPU is caused to enter the low power state is a platform driver which is a device driver for the motherboard on which the CPU is installed. The platform driver is operating system and hardware dependent and is normally provided with commercially available personal computer systems.

(b) Mechanism to Resume CPU Processing on Device Interrupts

Any device interrupt (such as keyboard, mouse, network, etc.) must "wake" the CPU from its low-power state. Thus, the CPU's low-power state is implemented such that any or a set of predetermined device interrupts will transition the CPU from low-power state to normal operation which commences at the first instruction of the interrupt handler invoked by the device interrupt.

Any device interrupt restores the CPU to its running state by causing the CPU to exit the low power state according to well known techniques. For example, in the Intel 80486 microprocessor, the CPU transitions from the low power state it is in after a HALT instruction has been executed by starting any internal CPU clocks that were shut off and resuming execution as if the clocks were never disabled.

B. System Power Management

The power consumed by the platform/chipset and controller logic devices, i.e., core logic, influenced by system clocks can be managed by decreasing frequency or stopping the distributed clock(s) altogether when in low-power state. This will typically achieve a 10%–15% savings as compared with systems which do not manage power through decreasing frequency or stopping the distributed clock(s) when in low-power state. Where chipsets manage clock distribution, additional hardware mechanisms for curtailing clocks may be incorporated which can be activated by software but must be de-activated automatically in hardware. Examples of such additional hardware mechanisms and how they may be implemented are as follows.

The mechanisms described above concerning CPU power management are used to reduce power consumed as a result of the CPU's idle execution cycles. In addition to power consumption related to CPU execution, an additional portion of power is consumed in buses, chipsets and controllers that can be eliminated resulting in additional power savings. Such power consumption is distributed across the platform chipset, internal buses and controller devices. The power consumption typically consists of a static component and a dynamic component. The static component is consumed by DC elements such as terminations. The dynamic component is consumed by AC elements such as switching transistors.

It is theoretically possible to power sequence at the component level directly from the PM coordinator, when present. However, it is more practical to provide a single hardware interface at the chipset and bus controller hardware level. The preferred embodiment for hardware power sequencing is described below. It should be noted that such sequencing should always be done with the full awareness of the PM coordinator, if present, which ensures consistency of power states between a device, its controller electronics and its driver.

The logic for controlling bus power is ideally integrated within the chipset. However, bus controller functions are easily augmented outside of a standard chipset with external logic elements using techniques that should be readily apparent to persons skilled in the general area of logic design. The power control sequence illustrated in FIG. 4 and described below are equally applicable to both integrated and discrete logic designs.

The bus power-down sequence is typically initiated when the PM coordinator, if present, initiates an I/O cycle to access the stop-bus-clock register bit in the chipset. If there is no PM coordinator, the bus power-down sequence can be automatically invoked in hardware when a predefined set of conditions takes place, e.g., OS_Idle and no external device activity for a set period of time. Having an I/O cycle access the stop-bus-clock register bit in the chipset causes the bus clock frequency to be reduced to its minimum level and the AC power component of the sub-system to be reduced proportionately. The minimum frequency value is typically set forth in the bus hardware specification. If the clock frequency can be reduced to 0 Hz, then this step is followed by powering off static bus terminations and finally by disconnecting the power supply plane to the bus itself. Disconnection of terminations and power planes is typically done by placing appropriate power transducers in the path from the power path, which can be switched on or off by control signals generated by the bus control logic.

The bus power-up sequence is the reverse of the power-down sequence. It is initiated by the PM coordinator which ensures that any device which has been registered in the database tree as a child of this bus, does not get accessed while the bus is in the powered-down state. Alternatively, the bus power-up sequence can be automatically invoked in hardware when the chipset detects the generation of a bus cycle event. When a CPU cycle directed at the bus is detected by the chipset, it reverses the sequence executed for stopping the bus. The power plane is activated, thereby enabling power at card slots. Thereafter, static bus terminations are powered on. Finally, clock frequency is increased to the operating level. During clock frequency increase, the procedures dictated by the bus specification must be adhered to in order to allow phase lock circuits on card controller devices to start functioning. Such procedures may specify the rate at which the clock frequency can be increased as well as how long the frequency must be stable at the operating frequency before the first bus cycle occurs. This recovery period for bus operation must be ensured in hardware (or the PM coordinator software) before the bus is first used.

During bus power-down and power-up sequencing, the rate of frequency change must be controlled to ensure that the resulting power surges or sags are within safe operating limits. This is because the frequency changes on the bus are immediately perceived on all devices attached to the bus and the resulting AC power change occurs in real time.

If one or more of the predetermined interrupts which cause the CPU to exit its low power state has to be conveyed over a bus as a signal or as a message transfer, such a bus cannot be powered down, since this would cause a cyclical dependency which would cause the system to not wake up from the powered-down state. Likewise, device controllers and portions of chipsets which are required to be functional to convey signals or messages which cause wake-up events cannot be powered down in their entirety, although a limited amount of power down, e.g., standby mode, may be possible by careful design. Examples of such devices controllers are those associated with network and telephone/modem interfaces.

Although the foregoing description uses as examples motherboard chipsets and buses, the same methods may be applied iteratively to add-in cards and external buses such as disk controller cards, multi-disk data buses and disk spindles.

Figure 5A:
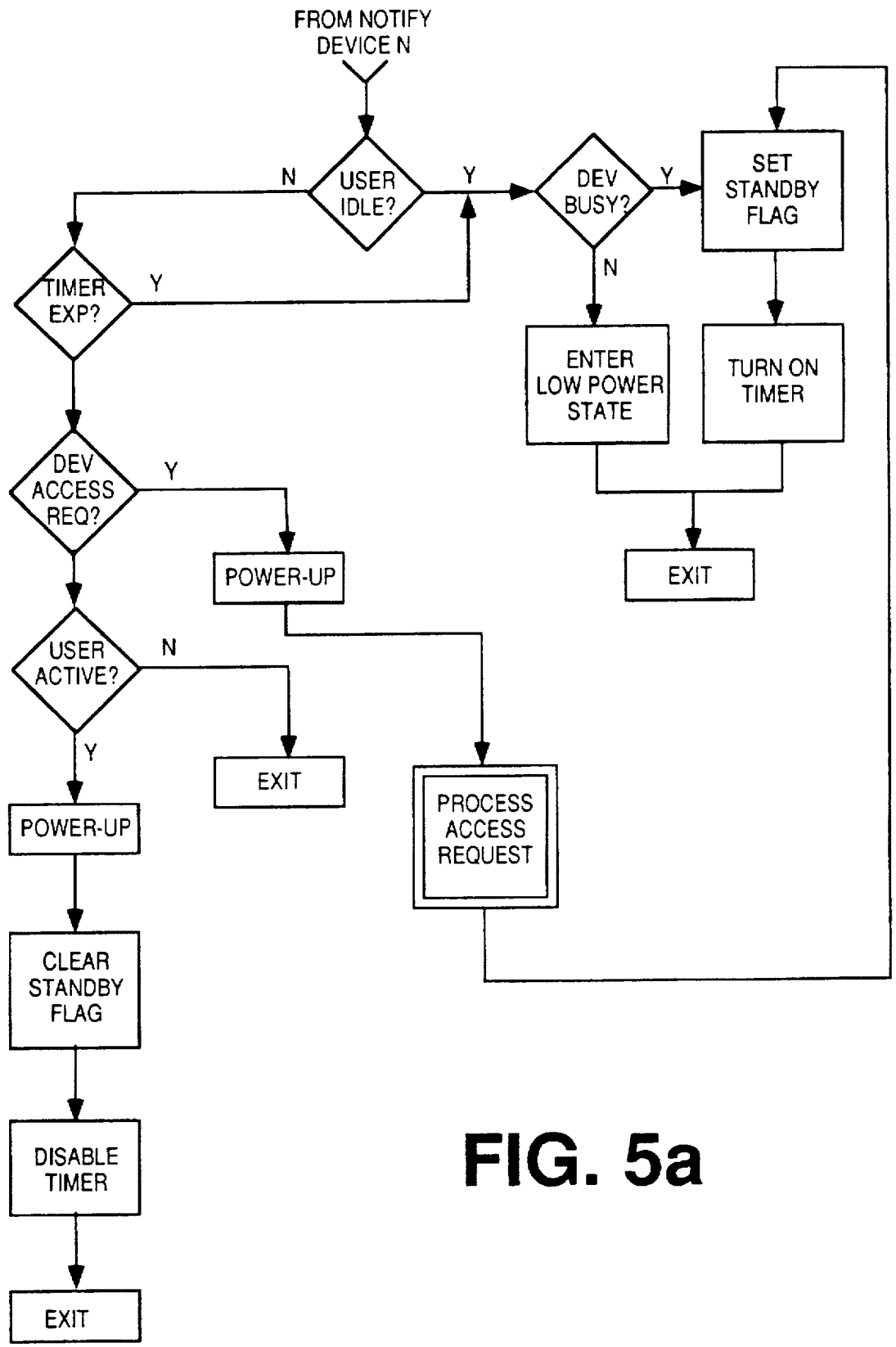
FIG. 5a is a flow diagram showing the flow of a User_Idle/User_Active PM handler within a device driver.
Figure 5B:
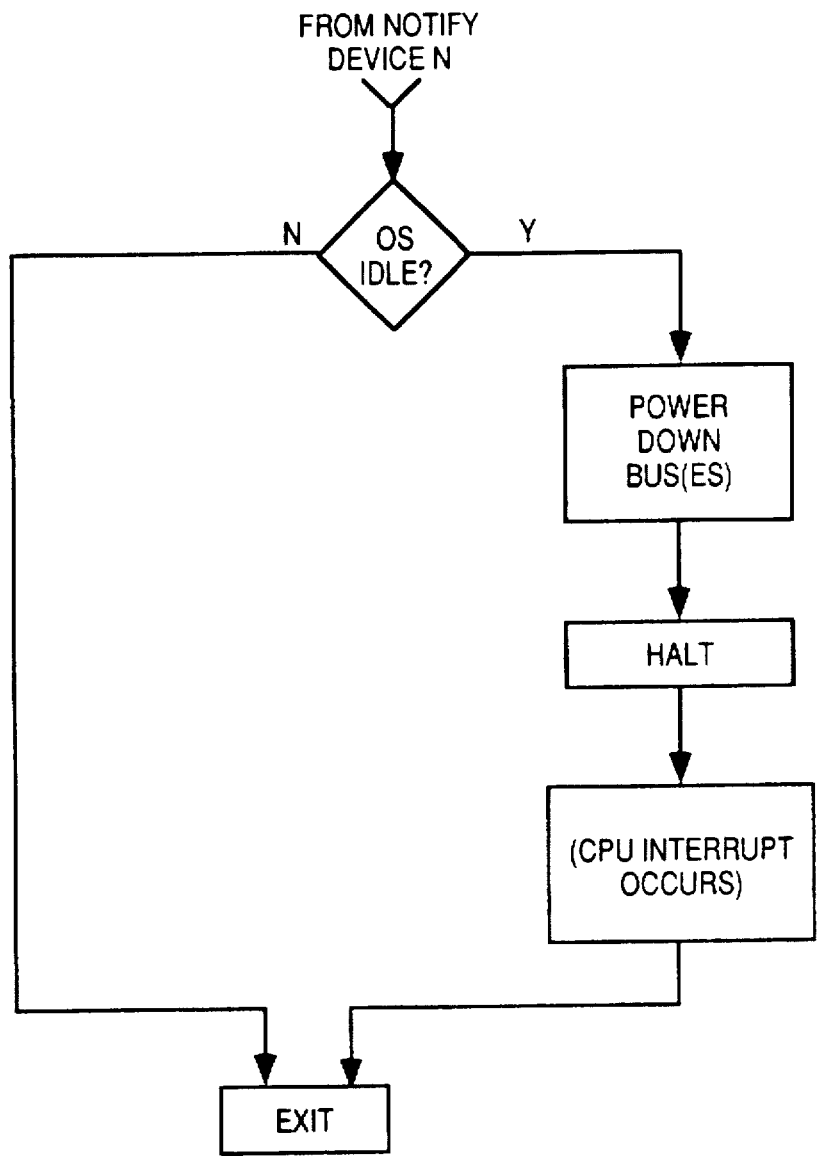
FIG. 5b is a flow diagram showing the flow of an OS_Idle PM handler within a device driver.

FIG. 5a is a flowchart showing the processing performed by a device driver modified by including a PM handler to take advantage of the power management techniques of the present invention for User_Idle/User_Active power events. The box labeled Process Access Request represents the functionality of the device driver, with the remaining portions of FIG. 4 represent the added functionality of the PM handler for processing a User_Idle power event. A flowchart for Sleep/Wakeup power events would be similar except that, as noted above, for User_Idle and User_Active, an idle/sleep timer is set to a user configurable amount of time, while for the Sleep and Wakeup power events no timer is used. Instead, the Wakeup power event causes the device to wake up immediately, and the Sleep power event causes the device to be put into a lower power state when the device is no longer in use and there are no pending device access requests. For the OS_Idle power event, FIG. 5b is a flow chart showing the processing performed by a device driver modified by including a PM handler to take advantage of the power management techniques of the present invention for OS_Idle power event. The details for modifying an existing device driver to include the above-described functions should be readily apparent to persons skilled in the field of the invention from this description and FIG. 4.

We claim:

1. In a personal desktop computer having a CPU and on-board system devices, a system for the management of power consumption of the on-board system devices comprising:

a) an operating system for selectively providing CPU cycles to a plurality of actively running tasks;

b) means for generating an OS Idle signal during periods of time when no actively running tasks require CPU cycles;

c) a system device driver which operates to cause one of the on-board system devices to enter a low power state when said OS-Idle signal is generated and the one on-board system device is inactive for a predetermined period of time;

d) means for removing said on-board system devices from said low power state;

e) means for initiating a bus power-down sequence by initiating a stop-bus-cycle register bit to thereby reduce a bus clock frequency to a predetermined minimum level and reduce an AC power component of the one on-board system device proportionately;

f) means for initiating a bus power-up sequence upon detection of a bus cycle event.

2. The system defined by claim 1 wherein said bus power-down sequence initiating means reduces said bus clock frequency to 0 Hz, powers off static bus terminations and disconnects a power supply plane from the bus.

3. The system defined by claim 2 wherein said bus power-up sequence initiating means activates connects the power supply plane to the bus, powers on said static bus terminations and increases said bus clock frequency to a predetermined operating level.

4. A system defined by claim 1 wherein said OS Idle signal generating means comprises a computer program which generates the OS Idle signal when the operating system enters an idle loop.

5. A system defined by claim 1 wherein said means for removing comprises a computer program which generates a power event.

6. A system defined by claim 1 wherein said means for initiating a bus power down sequence comprises a computer program which generates a power event.

7. A system defined by claim 1 wherein said means for initiating a bus power up sequence comprises a computer program which generates a power event.

* * * * *